United States Patent [19]

Sainomoto et al.

[11] Patent Number: 4,706,153
[45] Date of Patent: Nov. 10, 1987

[54] LEAKAGE DETECTING DEVICE FOR ELECTRICAL APPLIANCE

[75] Inventors: Yoshinori Sainomoto; Nobuteru Maekawa, both of Hikone, Japan

[73] Assignee: Matsushita Electric Works Ltd., Osaka, Japan

[21] Appl. No.: 870,705

[22] Filed: Jun. 4, 1986

[30] Foreign Application Priority Data

Jun. 25, 1985 [JP] Japan ................................ 60-141057

[51] Int. Cl.[4] .............................................. H02H 3/00
[52] U.S. Cl. ........................................ 361/42; 361/50; 361/178; 307/118
[58] Field of Search ..................................... 361/42–50, 361/115, 178; 307/116–118; 340/604, 690

[56] References Cited

U.S. PATENT DOCUMENTS

| 1,667,655 | 4/1928 | Clothier et al. | 361/44 X |
| 3,128,417 | 4/1964 | Brown et al. | 361/170 |
| 3,813,579 | 5/1974 | Doyle et al. | 361/46 |
| 4,044,224 | 8/1977 | Jenkins et al. | 361/42 X |
| 4,464,582 | 8/1984 | Aragaki et al. | 307/118 |

FOREIGN PATENT DOCUMENTS 1408316 10/1975 United Kingdom .

Primary Examiner—A. D. Pellinen
Assistant Examiner—Todd E. DeBoer
Attorney, Agent, or Firm—Joseph G. Seeber

[57] ABSTRACT

A leakage detecting device for electrical appliance is provided with electrodes (17) for detecting a state in which an electrical appliance such as a hair dryer is submerged in water. When the electrodes (17) are in a short-circuited state, relay means (3) is driven to open a contact (7). As a result, supply of the power supply voltage from a commercial power source (1) to the loads such as a motor (15), a heater (16) and the like is stopped so that an accident due to leakage can be prevented in such cases as a case in which the electrical appliance has been dropped into the water.

12 Claims, 26 Drawing Figures

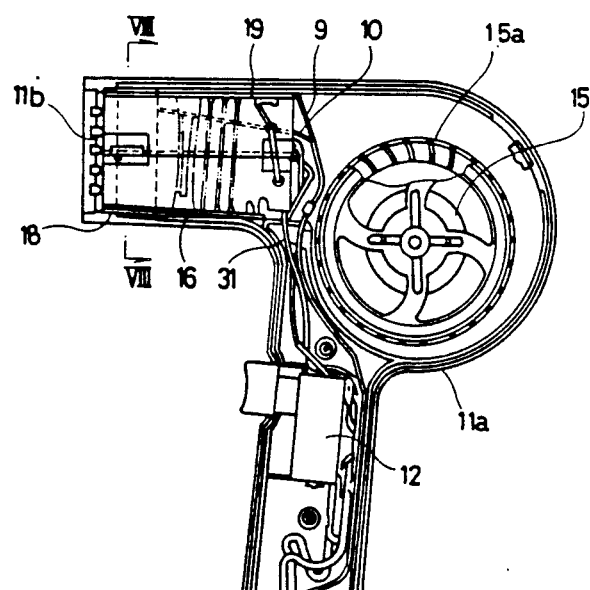
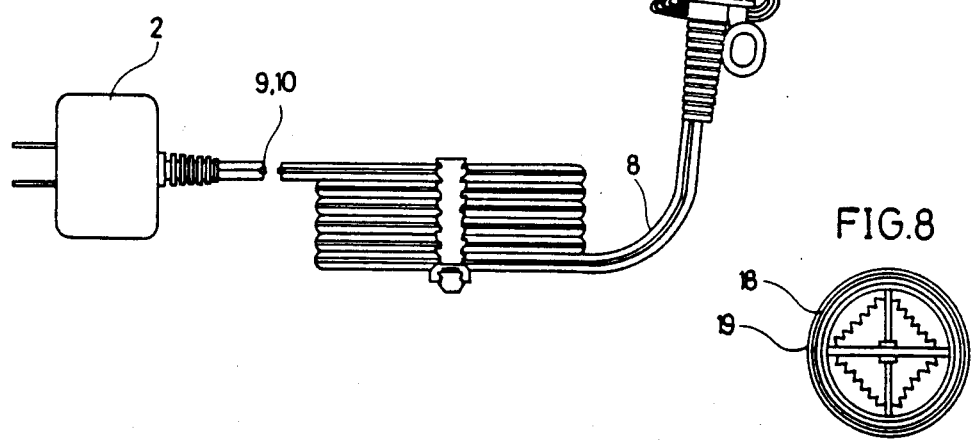
FIG.7
FIG.8

LEAKAGE DETECTING DEVICE FOR ELECTRICAL APPLIANCE

BACKGROUND OF THE INVENTION

1. Field of the Invention

The present invention relates to a leakage detecting device for electrical appliance. More particularly, the present invention relates to a leakage detecting device adapted to prevent a leakage accident such as injury to a human body by an electric shock and a damage to an electrical appliance such as a hair dryer or a hair iron when it has fallen into water or other liquid.

2. Description of the Prior Art

In a house of the latest design, a dressing table is often installed within a bath room. In such a case, if an electrical appliance such as a hair dryer or a hair iron with the power plug thereof being put into theplug receptacle has been dropped, by mistake, into the water of a bath tub or the like, there is a fear that an accident such as injury to a human body by an electric shock may occur. As the prior art for detecting leakage to prevent such an accident due to an electric shock, a technique as disclosed in British Patent Specification No. 1,408,316 or the Japenese Patent Publication Gazette No. 7885/1985 is known. A leakage detecting device indicated in the Japanese Patent Publication Gazette No. 7885/1985 uses a zero-phase current transformer so that when a ground current flows from a load to the ground, a difference between the input and output currents flowing in the zero-phase current transformer is detected as an induced voltage for the zero-phase current transformer to cause the contact to be turned off.

However, if an electrical appliance (a load) has been dropped in the water of a container such as a bath tub having a high insulation property, a leakage current flows in the water, and if a human in the water receives an electric shock, it is difficult for a zero-phase current transformer to detect the leakage current because a current equal to the leakage current returns to the power source, and the water and the power source also function as a part of the load. Furthermore, since a zero-phase current transformer detects generation of a minor leakage current, it is necessary to make it have a high sensitivity, which involves disadvantages in that the signal-to-noise ratio is not good and the zero-phase current transformer is liable to be affected by a magnetic noise from the exterior, causing erroneous operation. In addition, such a conventional device has a large number of components and is large-sized, and accordingly, the manufacturing cost thereof becomes high.

SUMMARY OF THE INVENTION

Therefore, a primary object of the present invention is to provide a leakage detecting device for electrical appliance, which can protect reliably a human body from electric shock and an electrical appliance from damage, and which can be manufactured at a low cost because the number of components in the device can be decreased.

Briefly stated, the present invention is a leakage detecting device for an electrical appliance of a type in which the plug thereof is put in a plug receptacle so that power source voltage is supplied to a load. This leakage detecting device is structured so that, when a pair or pairs of electrodes are in the water and short-circuited, relay means is driven to stop the supply of the power source voltage from the plug to the load through the contact.

Consequently, according to the present invention, if an electrical appliance is submerged under water or splashed with water, a conductive state is detected so that the relay means is operated immediately to stop the conduction to the electrical appliance. Thus, even if the electrical appliance is submerged in water, a human will never receive an electrical shock and deterioration of the performance of the electrical appliance due to the submersion can be avoided, and a firing or leakage accident due to conduction in a state in which water remains in some portions of the electrical appliance can be prevented. In addition, as compared with a conventional leakage breaker system, a device of the present invention has a simple structure and therefore the manufacturing cost can be remarkably decreased and the size of a device as a whole can be made small.

In a preferred embodiment of the present invention, relay means is contained in a plug and a pair or pairs of electrodes are contained in an electrical appliance. The relay means comprises: a core; a primary coil and a secondary coil wound around this core; a movable core; a fixed contact connected to a terminal of a plug; and a movable contact coupled to the movable core. Normally, the relay means supplies power source voltage to the primary coil to generate a magnetic flux in the core, so that the movable core is opened and the movable contact is in contact with the fixed contact, whereby the power source voltage is applied to the load. When the pair of electrodes detects a leakage, a magnetic flux is generated from the secondary coil and, as a result, the movable core is closed and the movable contact is detached from the fixed contact, whereby the power source voltage supplied to the load is stopped.

Thus, in this preferred embodiment of the present invention, the relay means is provided within the plug and a pair or pairs of electrodes need only to be provided within the body of the electrical appliance. Accordingly, without a complicated structure, supply of the power source voltage to the load can be stopped when leakage occurs.

In a further preferred embodiment of the present invention, a trip switch is used as the pair of electrodes. The trip switch includes a contact which is closed by reaction with water as a result of wetting of the electrical appliance. When this contact is closed, the relay means is operated so that supply of the power source voltage to the load is stopped.

In a further preferred embodiment of the present invention, a manual switch is provided in parallel with the pair of electrodes and, when this manual switch is turned off, the relay means is operated so that supply of the power source voltage to the load is stopped.

Accordingly, in this preferred embodiment of the present invention, if an electrical appliance is submerged in water with the power plug being connected to the plug receptacle, an electric shock to a human body can be prevented reliably because no electric power is supplied to the load of the electrical appliance.

Furthermore, in a preferred embodiment of the present invention, the present invention is applied to a hair dryer as an electrical appliance.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an essential portion sectional view showing a structure of a hair dryer in which a further embodiment of the present invention is applied.

FIG. 8 is a cross sectional view taken along the line VIII—VIII in FIG. 7.

FIGS. 16, 17A, 17B, 18A and 18B are views showing various examples of electrodes.

DESCRIPTION OF THE PREFERRED EMBODIMENTS

Figure 1:
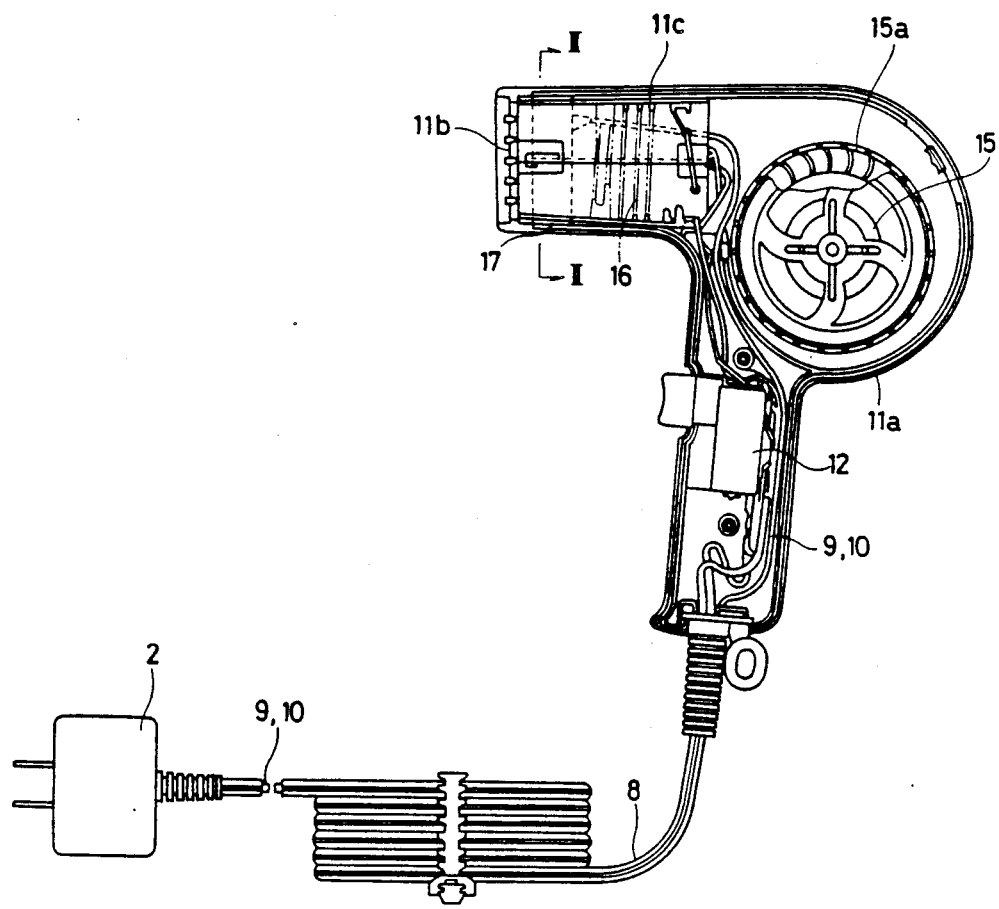
FIG. 1 is an essential portion sectional view showing a structure of a hair dryer in which an embodiment of the present invention is applied.
Figure 2:
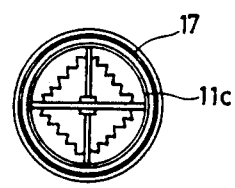
FIG. 2 is a cross sectional view taken along the line II—II in FIG. 1.
Figure 3:
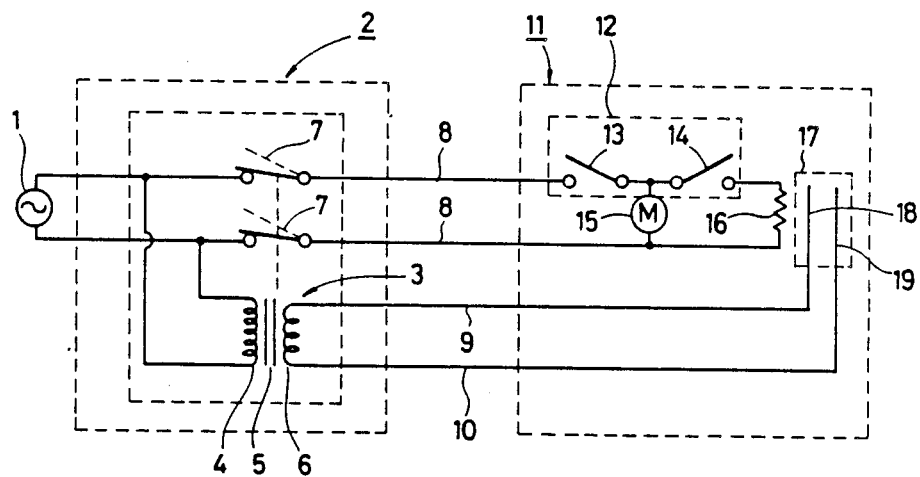
FIG. 3 is an electrical circuit diagram of an embodiment of the present invention.
Figure 4A:
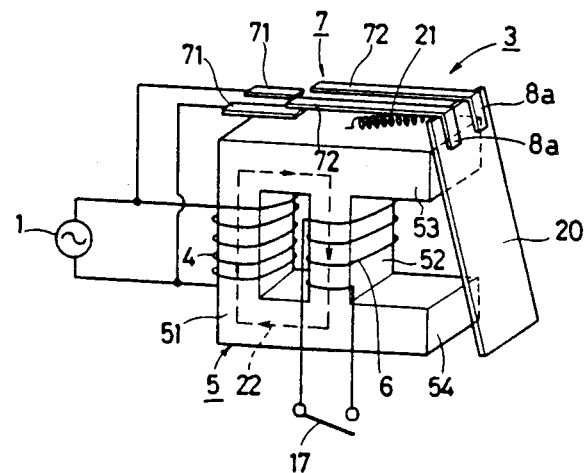
FIGS. 4A and 4B are views showing a structure of a transformer relay in an embodiment of the present invention.
Figure 4B:
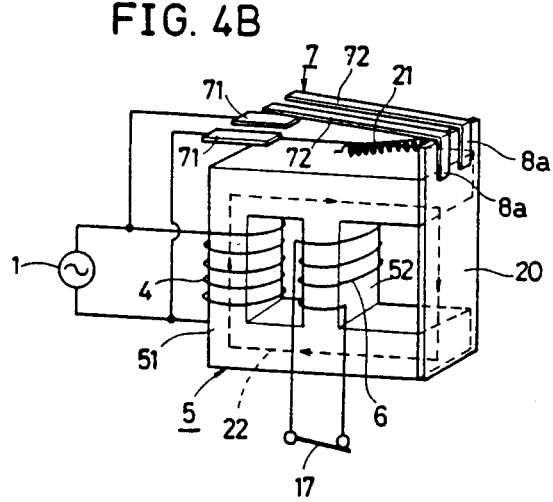

FIG. 1 is an essential portion sectional view showing a structure of a hair dryer in which an embodiment of the present invention is applied; FIG. 2 is a cross sectional view taken along the line II—II in FIG. 1; FIG. 3 is an electrical circuit diagram of this embodiment of the present invention; and FIGS. 4A and 4B are views showing a structure of a transfer relay used in this embodiment of the present invention.

First, referring to FIGS. 1 through 4B, a structure of the above stated embodiment of the present invention will be described. In the following description of the embodiment, the present invention is applied to a hair dryer as an example of an electrical appliance which is of a transportable type and is used in contact with a human body in a state in which the plug is put in a plug receptacle to supply power source voltage to the load.

The power plug 2 is put in a plug receptacle of a commercial power source 1. The power plug 2 contains a transfer relay 3 as the relay means. In a housing 11a of a hair dryer body 11, a cold and warm wind outlet 11b is formed. This housing 11a contains a manual switch 12 and a load circuit comprising a motor 15 and a heater 16. A fan 15a is coupled to the motor 15. The heater 16 is surrounded by a frame 11c. Electrodes 17 are provided in association with the frame 11c. The electrodes 17 are formed as a pair of electrode pieces 18 and 19 and serve to detect a leakage when the resistance of the pair of electrode pieces 18 and 19 is lowered if the hair dryer body 11 is submerged in water. The power plug 2 and the body 11 are connected by a power cable 8. This power cable 8 contains detecting lines 9 and 10. The manual switch 12 includes a contact 13 for operating the motor 15 and a contact 14 for operating the heater 16 as shown in FIG. 3.

Next, referring to FIGS. 4A and 4B, the structure of the transfer relay 3 will be described. The transfer relay 3 comprises a core 5, a primary coil 4, a secondary coil 6, a movable core 20 and a contact 7. The core 5 comprises a first core portion 51, a second core portion 52, a third core portion 53 projecting from one end of the second core portion 52, and a fourth core portion 54 projecting from the other end of the second core portion 52. The primary coil 4 is wound around the first core portion 51 and this primary coil 4 is connected to a terminal of the plug 2. The secondary coil 6 is wound around the second core portion 52 and this secondary coil 6 is connected to the electrodes 17 contained in the body 11 through the detecting lines 9 and 10.

One end of the movable core 20 is rotatably supported by the third core portion 53 and this movable core 20 is normally opened by the elastic force of a coil spring 21. The contact 7 includes fixed contact segments 71 and movable contact segments 72. The fixed contact segments 71 are connected to the terminal of the plug 2 and the ends of the movable contact segments 72 on one side are connected to one end of the third core portion 20 by means of terminal portions 8a. The terminal portions 8a are connected with one end of the power cable 8 and the other end of the power cable 8 is connected to the body 11.

Now, the operation of the transfer relay 3 will be described. When the electrodes 17 contained in the body 11 are opened, that is, when a state of leakage is not detected, power source voltage from the commercial power source 1 is supplied to the primary coil 4 so that a magnetic flux 22 is generated in the first core portion 51 and the second core portion 52 as shown in FIG. 4A. By this magnetic flux 22, a low voltage is induced in the secondary coil 6. In this state, the magnetic flux does not flow in the movable core 20 and the free end of the movable core 20 is kept separated from the fourth core portion 54 by the elastic force of the coil spring 21. At this time, the movable contact segments 72 coupled to the movable core 20 contact the fixed contact segments 71 and the power source voltage from the commercial power source 1 is supplied to the body 11 through the power plug 2, the fixed contact segments 71, the movable contact segments 72 and the power cable 8. The core 20 and the movable contact segments 72 are, needless to say, insulated from each other.

Then, when the electrodes 17 of the body 11 are in a short-circuited state as a result of submersion of the body 11 in water, a state as shown in FIG. 4B is brought about. More specifically, the resistance value between the pair of electrode pieces 18 and 19 becomes small so that the secondary coil 6 is short-circuited. Since the secondary coil 6 is wound to generate a magnetic flux opposite to the magnetic flux generated by the primary coil 4, it becomes difficult for the magnetic flux to pass through the second core portion 52 within the secondary coil 6. As a result, the magnetic flux 22 generated through the primary coil 4 flows from the first core portion 51 through the third core portion 53, the movable core 20 and the fourth core portion 54. On this occasion, energy is stored in a gap between the movable core 20 and the fourth core portion 54 and the movable core 20 moves in opposition to the elastic force of the coil spring 21, whereby the free end of the movable core 20 is attracted toward the fourth core portion 54 and is in contact therewith. In this state, the movable contact segments 72 coupled to the movable core 20 are separated from the fixed contact segments 71. Since the contact 7 is a contact of a type cutting off both ends of a load, supply of the power source voltage to the load circuit of the dryer body 11 is stopped.

Next, referring to FIGS. 1 through 4B, the operation of the whole of the above described embodiment of the present invention will be described. In the normal state, the resistance value between the pair of electrode pieces 18 and 19 of the electrodes 17 is high and the electrodes 17 are in the OFF state. Accordingly, the transfer relay 3 is as shown in FIG. 4A, namely, the free end of the movable core 20 is separated from the fourth core portion 54 and the movable contact segments 72 are in contact with the fixed contact segments 71. In consequence, power source voltage is supplied from the commercial power source 1 to the dryer body 11 through the power plug 2, the fixed contact segments 71, the movable contact segments 72 and the power cable 8.

When the contact 13 of the switch 12 of the dryer body 11 is turned on, power source voltage is supplied to the motor 15 so that the motor 15 rotates. According to the rotation of the motor 15, a cold wind is made to blow by the fan 15a. Then, when the contact 14 of the manual switch 12 is turned on, power source voltage is also supplied to the heater 16 so that the air is heated and a warm wind blows. When the contacts 13 and 14 of the manual switch 12 are both turned off, the dryer stops blowing the wind.

Now, assuming that the dryer body 11 is submerged in water, water penetrates between the pair of electrode pieces 18 and 19 of the electrodes 17 and the resistance value between the pair of electrode pieces 18 and 19 is rapidly lowered, whereby the secondary coil 6 of the transfer relay 3 is short-circuited. As a result, as described previously, electric current flows in the secondary coil 6 and a magnetic flux is generated in a manner opposing the magnetic flux 22 generated by the primary coil 5 so that the movable core 20 moves and the free end of the movable core 20 contacts the fourth core portion 54. Consequently, the movable contact segments 72 are moved away from the fixed contact segments 71 and power source voltage is not supplied to the load circuit of the dryer body 11.

Since the secondary coil 6 of the transfer relay 3 is supplied with a low voltage and is isolated from the commercial power source 1, it is a safe coil and serves to prevent a human from receiving an electric shock.

Figure 5:
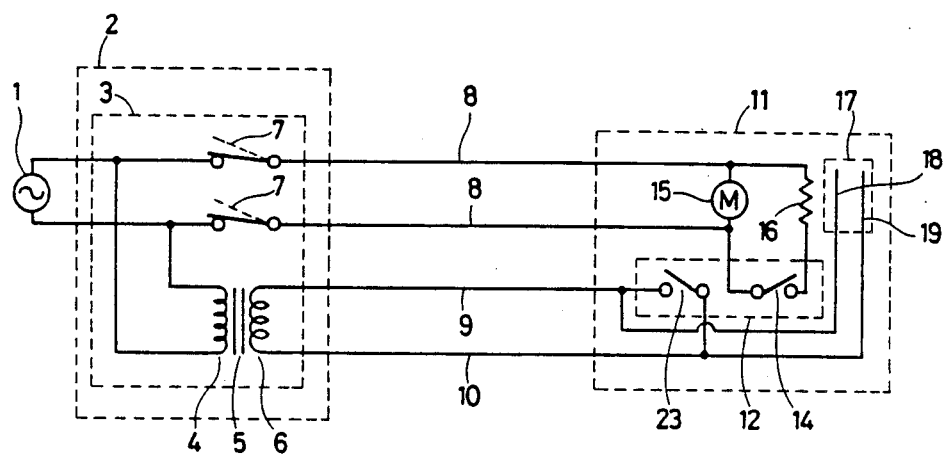
FIG. 5 is an electrical circuit diagram of another embodiment of the present invention.

FIG. 5 is an electrical circuit diagram of another embodiment of the present invention. In the embodiment shown in FIG. 5, a contact 23 is provided in the manual switch 12 and is connected in parallel with the electrodes 17 instead of the contact 13 shown in FIG. 3. The other structure of this embodiment in FIG. 5 is the same as the embodiment in FIG. 3. By the connection of the contact 23 in parallel with the electrodes 17, the contact 23 is turned on to short-circuit the secondary coil 6 of the transfer relay 3 when the switch 12 is turned off (the dryer is in the stop state). More specifically, when the manual switch 12 is turned off, a state equal to the state in which the electrodes 17 are short-circuited is established and the contact 7 of the transfer relay 3 is turned off so that power source voltage is not supplied to the load circuit of the dryer body 11 to bring the dryer into the OFF state.

When the manual switch 12 is turned on, the contact 23 is turned off and the contact 7 of the transfer relay 3 is turned on so that power source voltage is supplied to the motor 15 to send a cold wind. When the contact 14 is turned on in that state, power source voltage is also supplied to the heater 16 so that a warm wind blows. The other operation is performed in the same manner as in the above described embodiment.

In the embodiment shown in FIG. 5, the load circuit of the dryer body 11 is not supplied with any power source voltage even if the power plug 2 is connected to the commercial power source 1. Consequently, if the dryer body 11 is submerged in water in that state (this will be most likely to occur), an accident involving an electric shock can be prevented reliably.

Figure 6:
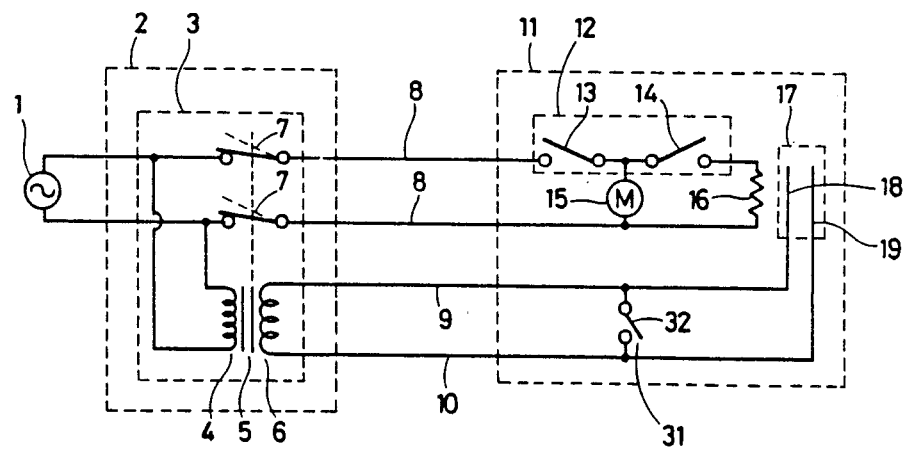
FIG. 6 is an electrical circuit diagram of a further embodiment of the present invention.

FIG. 6 is an electrical circuit diagram of a further embodiment of the present invention; FIG. 7 is an essential portion sectional view showing a structure of a hair dryer in which this embodiment of the present invention is applied; and FIG. 8 is a cross sectional view taken along the line VIII—VIII in FIG. 7.

Referring to FIGS. 6 to 8, this embodiment of the present invention will be described. In this embodiment, a trip switch 31 is provided in parallel with the electrodes 17 and a frame 11c of the heater 16 is utilized also as one electrode piece 19 of the electrodes 17. The other structure of the embodiment is the same as the above described embodiment shown in FIGS. 1 to 3.

The trip switch 31 is provided near a component whose performance is degraded once it is submerged in water, for example, the motor 15, and the trip switch 31 continues to cut off the circuit to prevent secondary failure after the body 11 of the hair dryer has been taken out from the water. More specifically, when the trip switch 31 is submerged in water, the contact 32 is turned on by chemical reaction or the like and this state is maintained after the dryer body 11 has been taken out of the water, whereby supply of electric power to the load circuit of the body 11 is kept stopped.

In the above described structure, power source voltage is not supplied if the performance of the hair dryer body 11 is worsened or the hair dryer is in trouble as a result of submersion of the body 11 in water, and accordingly, an accident such as firing or leakage caused by supply of power source voltage can be prevented. The hair dryer body thus submerged can be repaired by exchanging the trip switch 31 for a new one after inspection of the components.

Figure 9A:
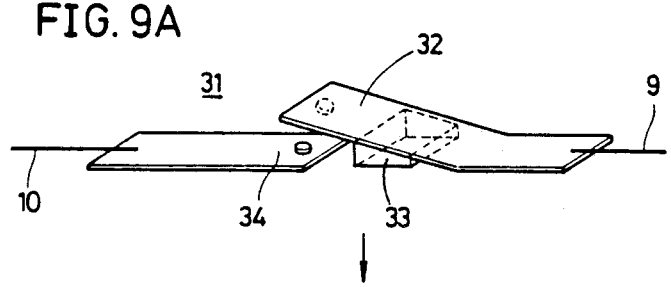
FIGS. 9A and 9B are views for explaining a structure and operation of a trip switch mechanism used in a further embodiment of the present invention.
Figure 9B:
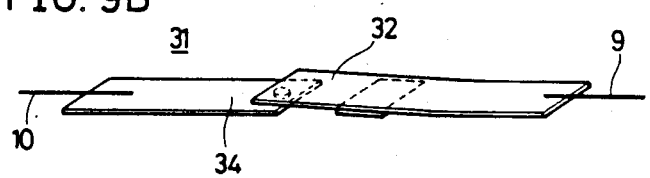

FIGS. 9A and 9B are views for explaining a structure and operation of a trip switch mechanism.

Referring to FIG. 9A, the trip switch 31 comprises a contact segment 32, a water soluble material 33 and a contact segment 34. The contact segment 32 is formed of an elastic material which can be inherently in contact with the contact segment 34, and the water soluble material 33 of such as crystal of sodium chloride is placed so as to push the contact segment 32 upward. The contact segment 32 is connected with one detecting line 9 and the contact segment 34 is connected with the other detecting line 10. If the trip switch 31 is submerged in water, the water soluble material 33 begins to be dissolved in water and the volume thereof decreases. As shown in FIG. 9B, the contact segment 32 is made in contact with the contact segment 34 by the elastic force of the contact segment 32 so that the contact of the trip switch 31 is closed and this closed state is maintained. Thus, using the trip switch 31, the contact can be closed as a result of a leakage when it is submerged in water.

FIGS. 10A through 14B are views for explaining structures and operation of other examples of a trip switch.

Figure 10A:
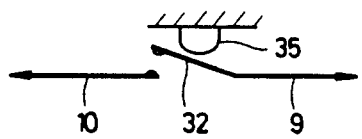
FIGS. 10A, 10B, 11A, 11B, 12A, 12B, 13A, 13B, 14A and 14B are views for explaining structures and operation of various examples of a trip switch.
Figure 10B:
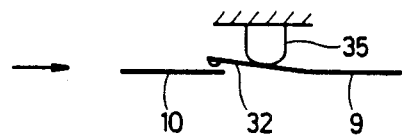

The example shown in FIGS. 10A and 10B uses a material 35 such as bridge structure of sodium polyacrylate, which is excellent in water absorption and water retentivity and swells hygroscopically. In other words, the contact segment 32 has such elastic force as to be opened normally. The hygroscopically swelling material 35 covered with a permeable elastic film is disposed above the contact segment 32 as shown in FIG. 10A. When the material 35 is submerged in water, the material 35 contains water and swells so that the contact segment 32 is in contact with the contact segment 34 as shown in FIG. 10B. Even after the material 35 has been taken out of the water, the closed state of the contact is maintained since the material 35 has water retentivity.

Figure 11A:
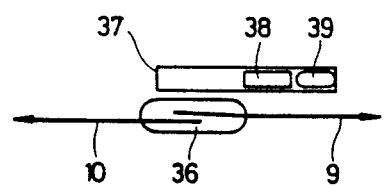
Figure 11B:
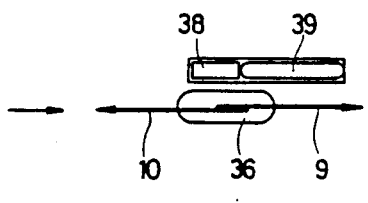

In the example shown in FIG. 11A, detecting lines 9 and 10 are connected to a reed switch 36 and a guard 37 is provided near the reed switch 36, a magnet 38 and a hygroscopically swelling material 39 covered with a permeable elastic film being contained in the guard 37. Normally, the material 39 is not swollen and accordingly the magnet 38 is at a position distant from the reed switch 36, which is turned off. When the switch mechanism in this state is submerged in water, the material 39 swells with water and the magnet 38 is pushed by the material 39 and is moved in the guard 37 as shown in FIG. 11B. When the magnet 38 approaches the reed switch 36, the reed switch 36 is turned on. Even after the switch mechanism has been taken out of the water, the contact of the reed switch 36 is kept closed because the swollen state of the material 39 is maintained.

Figure 12A:
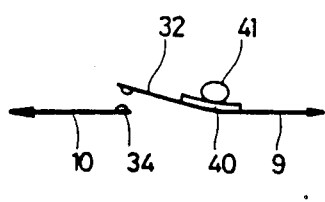
Figure 12B:
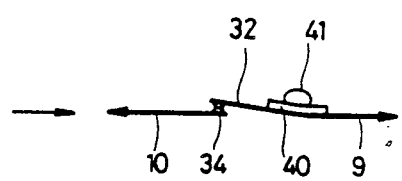

The trip switches shown in FIGS. 12A, 12B, 13A and 13B are examples using a pyrogenic material such as sulfate which produces heat by reaction with water. More specifically, the example shown in FIG. 12A uses an irreversible shape memory alloy 40 as the contact segment 32 shown in FIG. 9A. A pyrogenic material 41 such as sulfate is disposed near the shape memory alloy 40. When the pyrogenic material 41 is submerged in water, it produces heat by reaction with water and by this heat, the shape memory alloy 40 is transformed as shown in FIG. 12B so that the contact segment 32 is closed and this closed state is maintained.

Figure 13A:
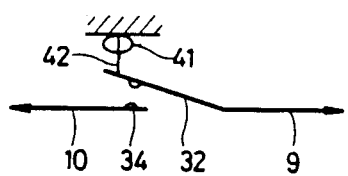
Figure 13B:
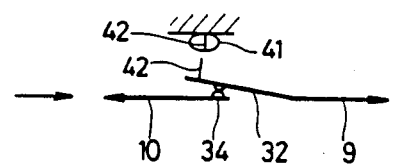

The example shown in FIG. 13A uses an elastic material as the contact segment 32, which inherently tends to be in contact with the contact segment 34 but is fixed to be opened from the contact segment 34 by means of a thermal fuse 42 such as solder. The pyrogenic material 41 is disposed around the thermal fuse 42. When the pyrogenic material 41 is submerged in water, the pyrogenic material 41 reacts with water to generate heat so that the thermal fuse 42 is melted. As a result, as shown in FIG. 13B, the contact segment 32 is in contact with the contact segment 34 by the elastic force of the contact segment 32 so that the contact is closed.

Figure 14A:
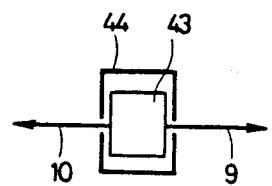
Figure 14B:
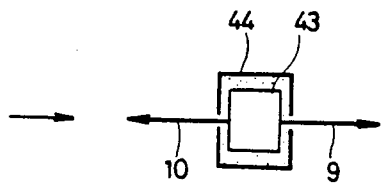

The trip switch shown in FIGS. 14A and 14B uses a humidity sensor such as a sensor of TiO-SiO$_2$ ceramic. More specifically, the humidity sensor 43 is provided between the detecting lines 9 and 10 and a water retentive material 44 having good water absorptivity is provided around the humidity sensor 43. The humidity sensor 43 has a high resistance value before it is submerged in water. When the humidity sensor 43 is submerged in water, water is absorbed in the water retentive material 44 and this water causes the humidity sensor 43 to have a low resistance value so that the trip switch is turned on. After the switch has been taken out from the water, the ON state is maintained because the water retentive material 44 continues to keep water.

In the trip switch 31 structured as described above, it does not matter if the reaction speed is a little decreased. When the dryer body 11 is submerged in water, the electrodes 17 react immediately to interrupt the transfer relay 3 and, therefore, the trip switch 31 has only to react to be turned on till the dryer body 11 is taken out from the water. If the dryer body 11 has been submerged in water for a long period, the ON resistance between the pair of electrode pieces 18 and 19 of the electrodes 17 becomes high due to electrolysis of water or the like and it becomes easier for the trip switch 31 to be maintained in the ON state, and thus safety can be assured with higher reliability.

Figure 15A:
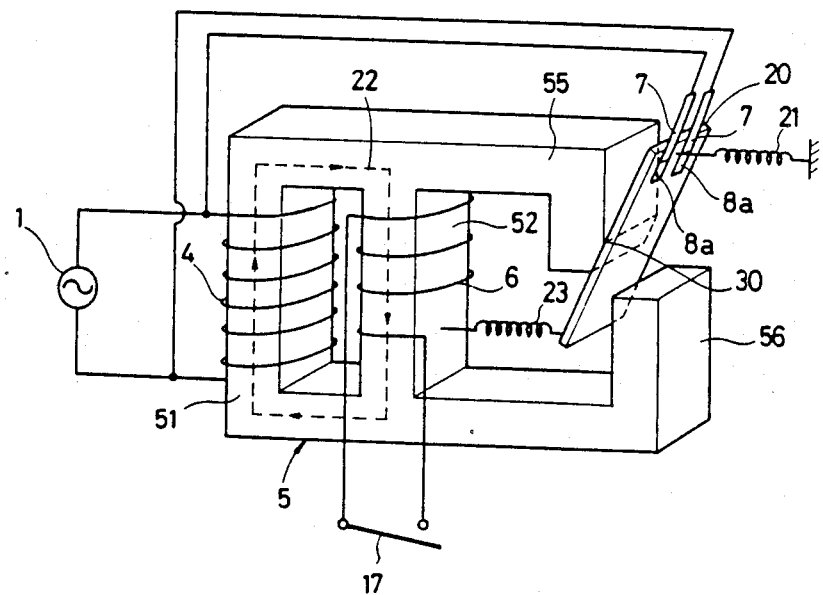
FIGS. 15A and 15B are views showing a structure of another example of a transformer relay.
Figure 15B:
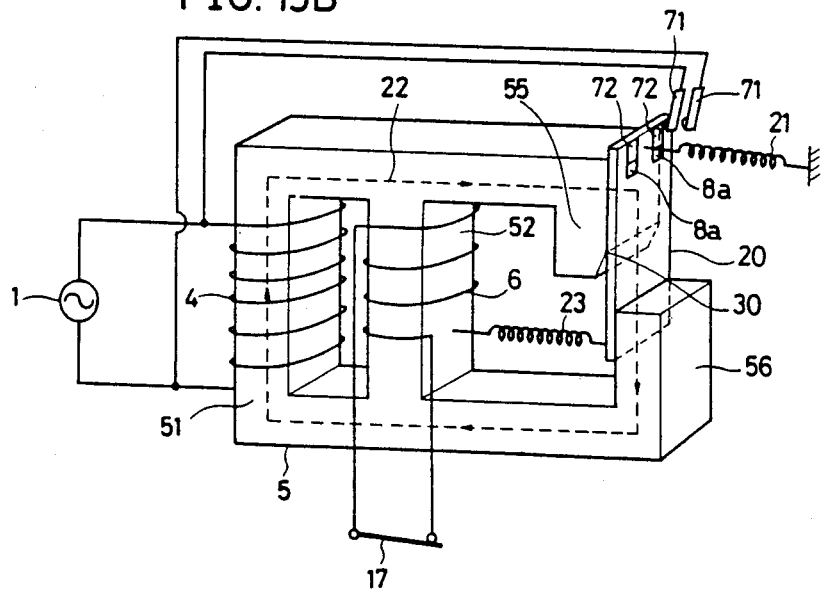

FIGS. 15A and 15B are views showing a structure of another example of a transfer relay. Referring to FIG. 15A, a fifth core portion 55 and a sixth core portion 56 are provided in the core 5 in addition to the first core portion 51 and the second core portion 52. The fifth core portion 55 extends from one end of the second core portion 52 and the sixth core portion 56 extends from the other end of the second core portion 52, the outer side surface of the fifth core portion 55 and the inner side surface of the sixth core portion 56 being formed on the same plane. The end surfaces of the fifth core portion 55 support rotatably a movable core 20 with the central portion of the movable core 20 being regarded as a fulcrum 30. One end of a coil spring 21 is coupled to one end of the movable core 20 and a coil spring 23 is provided between the other end of the movable core 20 and the second core portion 52. Accordingly, the movable core 20 is normally rotated clockwise by the coil springs 21 and 23, one end of the movable core 20 being separated from the outer side surface of the fifth core portion 55 and the other end thereof being separated from the inner side surface of the sixth core portion 56. Movable contact segments 72 are formed at one end of the movable core 20 and the movable contact segments 72 are in contact with fixed contact segments 71.

When the electrodes 17 are turned off in the transfer relay constructed as described above, the movable core 20 is distant from the fifth core portion 55 and distant from the sixth core portion 56 by the elastic forces of the coil springs 21 and 23, respectively, and the movable contact segments 72 are in contact with the fixed contact segments 71, as shown in FIG. 15A.

If the electrodes 17 are turned on as a result of submersion in water, magnetic flux hardly flows in the secondary coil 6 and the movable core 20 rotates anti-clockwise in opposition to the elastic forces of the coil springs 21 and 23, whereby one end of the movable core 20 is attracted to the fifth core portion 55 and the other end thereof is attracted to the sixth core portion 56 as shown in FIG. 15B. As a result, the movable contact segments 72 are separated from the fixed contact segments 71 so that the contact 7 is turned off.

The transfer relay shown in FIGS. 15A and 15B has an advantage that erroneous operation will hardly be caused by a linear shock because the movable core 20 is balanced on the fulcrum point 30.

Figure 16:
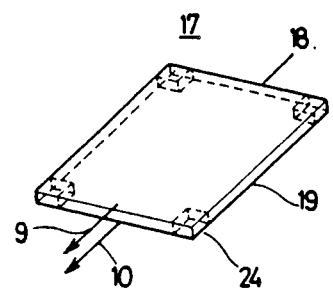
Figure 17A:
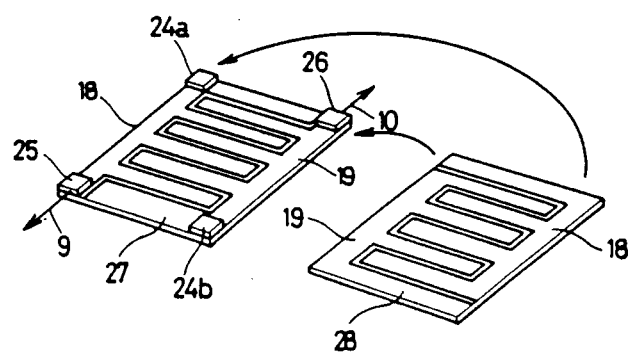
Figure 17B:
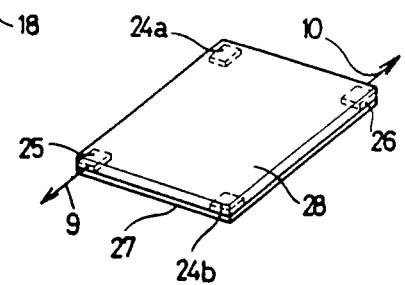

FIGS. 16, 17A and 17B are views showing various examples of the electrodes provided in a hair dryer body.

Referring now to FIGS. 16 through 17B, the electrodes 17 will be described. For the electrodes 17, it is necessary to make the area of the electrodes as large as possible and the distance between the electrodes as short as possible so that the transfer relay 3 is operated even by water of high resistance. Therefore, in the example shown in FIG. 16, electrode pieces 18 and 19 are formed by two sheets of metallic plates of stainless steel or the like having high resistance to corrosion, these electrode pieces 18 and 19 being opposed to each other. Spacers 24 serving as insulators for maintaining a certain distance between the electrodes are disposed at the four corners between the electrode pieces 18 and 19, the spacers 24 being fixed to the respective electrode pieces 18 and 19 by an adhesive agent.

The electrodes 17 shown in FIG. 17A are formed in the following manner. Electrode pieces 18 and 19 each shaped like comb-teeth are formed close to each other on one base plate 27 by applying etching or the like to copper foil on the base plate 27, and two spacers 24a and 24b formed of an insulating material and two metallic spacers 25 and 26 are fixed at the four corners of the base plate 27, respectively. In the same manner as for the base plate 27, electrode pieces 18 and 19 shaped like comb-tooth are formed on the other base plate 28 so that the electrode pieces 18 and 19 on the base plate 27 are opposed to the electrode pieces 18 and 19 on the base plate 28, respectively. The base plates 27 and 28 are faced toward each other with the spacers 24a and 24b being interposed therebetween, so that the portions contacting the metallic spacer 25 have one polarity equal to that of the portions contacting the spacer 24a and the portions contacting the metallic spacer 26 have the other polarity equal to that of the portions contacting the spacer 24b. Detecting lines 9 and 10 are connected to the metallic spacers 25 and 26, respectively. The spacers 24a and 24b are fixed to the base plate 28 by an adhesive agent and the metallic spacers 25 and 26 are electrically connected to the base plate 28 by soldering.

In the above described embodiment shown in FIGS. 16, 17A and 17B, four openings as air exits are formed by thus providing the spacers 24 at the four corners of the base plates, and in consequence, irrespective of the direction and the speed of penetration of water into the electrodes 17, air will never remain within the electrodes 17 and a low resistance value as desired can be obtained. The copper foil patterns of the electrode pieces 18 and 19 are preferably plated with a material such as nickel having good anti-corrosive property so that corrosion on the surfaces of the electrodes can be prevented.

Although, in the above described embodiments, the electrodes 17 are provided near the outlet opening 11b of the hair dryer body 11, the electrodes 17 may be provided in various portions depending on situations in which water enters; for example, they may be provided in the vicinity of an inlet opening of the body 11, the manual switch 12 or the outlet of the power cable 8.

In the above described embodiments, the distance between the electrode pieces 18 and 19 is made short and, consequently, it takes much time to remove the water from the space between the electrode pieces 18 and 19 once the dryer body 11 has been submerged in water. Furthermore, in a transfer relay system, once the contact has been turned on, the resistance between the electrode pieces 18 and 19 for turning off the contact is required to be higher than the resistance in the ON state of the contact because of hysteresis. Accordingly, the time required for turning off the contact is further increased. Thus, once the dryer body 11 has been submerged in water, the OFF state can be maintained for a long period and, therefore, the device can be set so that it may be automatically returned to the initial state after having been turned off only for a period sufficient to enable the water in the electrical appliance to be removed therefrom.

In addition, although the present invention is applied to a hair dryer in the above described embodiments, the present invention is not limited thereto. The present invention is applicable to any electrical appliance as far as such electrical appliance is transportable and used in contact with a human body in a state in which power source voltage is supplied to the load by putting the plug into a plug receptacle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A leakage detecting device which detects leakage when a power source supplies voltage through a plug to a load in an electrical appliance, the electrical appliance being connected to the plug by a plurality of cords, at least one of said cords being connected to the load, said leakage detecting device comprising:

a pair of electrodes contained within said appliance and being electrically independent of the load, a remainder of said plurality of cords being connected to said pair of electrodes, and relay means contained within said plug and including at least one contact for supplying the voltage from said power source through said plug to the load, said contact being opened so as to stop supplying the voltage from said power source through said plug to the load when said pair of electrodes is in a short-circuited state;

wherein said relay means comprises a core, a primary coil wound around said core and connected to a terminal of said plug so that magnetic flux is generated in said core when said power source supplies said voltage, a secondary coil wound around said core and connected to said pair of electrodes so that magnetic flux is generated to cancel the magnetic flux generated in said core by said primary coil when said pair of electrodes is in a short-circuited state, and a movable core normally in an open position and moved to a closed position in response to said magnetic flux being generated by said secondary coil, said at least one contact being opened when said movable core is closed, thereby stopping the supply of voltage from said power source through said plug to the load.

2. A leakage detecting device used in an electrical appliance in accordance with claim 1, wherein
said electrical appliance includes a manual switch connected between said at least one contact and the load.

3. A leakage detecting device used in an electrical appliance in accordance with claim 1, wherein
said electrical appliance includes manual switch connected in parallel with said pair of electrodes for operating said relay means when it is turned off so that the supply of voltage from said power source to the load is stopped.

4. A leakage detecting device used in an electrical appliance in accordance with claim 1, comprising:
a trip switch for operating said relay means when said further contact is closed, so that supply of the voltage from said power source to the load is stopped.

5. A leakage detecting device used in an electrical appliance in accordance with claim 4, wherein
said trip switch comprises:
an additional contact tending to be closed by elastic force of the contact, and
a water soluble material for opening normally said contact in opposition to said elastic force and closing said contact as a result of decrease in the volume of said water soluble material which reacts with water by penetration of water.

6. A leakage detecting device used in an electrical appliance in accordance with claim 4, wherein said trip switch comprises:
an additional contact tending to be opened by elastic force of the contact, and
a swelling material having a volume which swells by reaction with water at the time of penetration of water so that said swelling material presses said additional contact to make said additional contact closed.

7. A leakage detecting device used in an electrical appliance in accordance with cliam 4, wherein said trip switch comprises:
a read switch having an additional contact,
a magnet located normally at a position distant from the additional contact of said reed switch, and
a material having a volume which swells by water at the time of penetration of water so that said magnet is made to approach said reed switch to close said additional contact.

8. A leakage detecting device used in an electrical appliance in accordance with claim 4, wherein said trip switch comprises:
an additional contact formed to be opened normally,
a shape memory alloy fixed to said additional contact, and
a pyrogenic material porvided in the vicinity of said shape memory alloy to product heat by reaction with water at the time of penetration of water so that said shape memory alloy is transformed by said heat to cause said additional contact to be closed.

9. A leakage detecting device used in an electrical appliance in accordance with claim 4, wherein said trip switch comprises:
an additional contact formed to be closed inherently by elastic force of the additional contact,
a thermal fuse provided to open said additional contact in opposition to said elastic force of the additional contact, and
a pyrogenic material which produce heat by reaction with water at the time of penetration of water so that said thermal fuse is melted by said heat to cause said additional contact to be closed.

10. A leakage detecting device used in a electrical appliance in accordance with claim 4, wherein
said trip switch is provided on a water retentive material having good water absorptivity and comprises a humidity sensor which has normally a high resistance value, the resistance value being lowered when said trip switch is submerged in water.

11. A leakage detecting device used in an electrical appliance in accordance with claim 1, wherein said electrical appliance is hair dryer including an output of hot wind, and said pair of electrodes is provided in association with said outlet of hot wind.

12. A leakage detecting device used in an electrical appliance in accordance with claim 11, wherein
said electrical appliance is a hair dryer provided with a heater and frame of said heater, and
one electrode out of said pair of electrodes is used also as the frame of said heater.

* * * * *